Patented July 25, 1950

2,516,627

UNITED STATES PATENT OFFICE 2,516,627

PRODUCTION OF ALLYL ACRYLATE FROM ACROLEIN

George W. Hearne and Carl G. Schwarzer, El Cerrito, Calif., assignors to Shell Development Company, San Francisco, Calif., a corporation of Delaware No Drawing. Application June 8, 1948, Serial No. 31,833

4 Claims. (Cl. 260—486)

This invention relates to the preparation of allyl acrylate by the condensation of acrolein by aluminum alcoholates.

Over a period of many years, attempts have been made, without success, to prepare allyl acrylate by the condensation of acrolein by aluminum alcoholates. The reaction was first attempted over forty years ago by Tischtschenko in his pioneering work—work for which Child and Adkins have expressed "the utmost respect" because of the uniformity with which they were able to substantiate his conclusions upon duplication of his experiments. Tischtschenko was unable to recover allyl acrylate in his experiments, apparently due to the readiness with which the acrolein was resinified or oxidized by the aluminum alkoxide. The possibility of preparing allyl acrylate by the condensation of acrolein was exhaustively re-examined in 1934 by Zappi and Labriola (Anales asoc. quim. Argentina, 22, 133–42). In an extensive series of experiments, numerous attempts were made to prepare allyl acrylate from acrolein, but in each case only resinous or high-boiling products were obtained. In no case was it found possible to recover allyl acrylate from the reaction mixture.

U. S. Patent 2,250,520, to Bludworth, discloses a process claimed to convert methacrolein to methallyl methacrylate. It is not claimed that the process disclosed is effective using acrolein.

It is known that acrolein is among the most readily polymerized, and under certain conditions the most readily polymerized of the alpha, beta-olefinic aldehydes. The great reactivity of acrolein, and its marked tendency to form polymers, appears to be an important factor in the inability of the prior art workers to obtain allyl acrylate by its condensation by aluminum alcoholates, since in the prior experiments resins and other polymeric materials always were obtained instead of the desired allyl acrylate.

The principal object of the present invention is a method for preparing allyl acrylate via the condensation of acrolein by aluminum alcoholates. Another object of the invention is to overcome the difficulties heretofore experienced in the prior art, and thereby to provide a successful and practicable method for preparing allyl acrylate by the condensation of acrolein by aluminum alcoholates.

Other objects of the invention will become apparent as the invention is more fully hereinafter described and claimed.

In contrast to the unsuccessful attempts in the prior art, we have discovered and conceived a successful and commercially practicable method for preparing allyl acrylate by condensing acrolein in the presence of aluminum alcoholate.

Broadly stated, our method of preparing allyl acrylate comprises mixing a quantity of acrolein that forms a clear solution upon dilution at 25° C. with 25 times its volume of iso-octane that has been saturated at about 25° C. with water, with an aluminum alcoholate and an organic solvent, allowing the mixture to stand, and recovering allyl acrylate from the mixture. The process may be executed advantageously by mixing the said acrolein with an aluminum alcoholate, such as aluminum isopropoxide, in a dispersing medium consisting of an organic solvent, such as xylene or other anhydrous organic solvent, allowing the mixture to stand, as at ordinary or moderately elevated temperatures until by any suitable test substantial completion of the reaction is indicated, and then recovering allyl acrylate from the mixture. If desired, any unreacted acrolein that is present may be recovered at the same time and re-utilized in the process.

In the practice of the process of the invention, the acrolein may be initially synthesized by any desired method or it may be obtained from any convenient source. We take for testing a measured portion of the acrolein, preferably about 2 cubic centimeters, and mix the measured test portion with 25 times its volume of iso-octane that has been saturated at about 25° C. with water, the temperature during the test being maintained at about 25° C. The iso-octane may be conveniently saturated with water by agitating it with an excess of water at about 25° C. and storing the thus saturated iso-octane in contact with liquid water at about 25° C. After the test portion of acrolein is mixed with the water-saturated iso-octane, the mixture is observed by the naked eye in diffused light, e. g., diffused daylight, for the possible formation of turbidity. If appreciable turbidity forms, we treat the acrolein in any suitable manner so that upon testing of a further portion in the above manner a clear, i. e., non-turbid, mixture with the water-saturated iso-octane is formed. Since the specific method of treating the acrolein to accomplish this object, if such treatment is necessary, does not, in our opinion, form a part of the invention, it will be understood that the invention is not limited according to the particular method that may be employed to this end. One effective manner comprises cooling the acrolein to a temperature near, but above, its freezing point, say to −70° C., and filtering off any solid material which separates. The acrolein thereafter additionally may be fractionally distilled with separation, for use in the present process, of the portion which distills at a temperature above about 52.6° C. under 760 mm. Hg pressure. Another suitable method of treating the acrolein is to fractionally distill it under reduced pressure, preferably a pressure not over about 100 mm. Hg, the distillate being condensed with the aid of refrigeration and only the constant-boiling portion of the distillate being collected for use in the present process. Other methods which we may employ upon occasion for treating the acrolein for the accomplishment of the above object comprise contacting the liquid acrolein, e. g., at about room temperatures, with an adsorbent or absorbent solid that is inert with respect to acrolein, such as charcoal, alumina, anhydrous calcium sulfate, kieselguhr, pumice, silica gel, asbestos, clay, or the like. The acrolein may be slowly percolated through a bed of the absorbent or adsorbent solid, or the solid may be suspended in the acrolein, say in an amount equal to the amount of the acrolein, and after a suitable time, generally several hours, the acrolein separated from the solid by filtration or other suitable means. One, or more than one of the foregoing methods for the accomplishment of the above object may be employed.

In the execution of the process of the invention, acrolein which has been thus tested and found, by test of an aliquot, to form a clear solution in the wet iso-octane, is mixed with an aluminum alcoholate and an inert organic solvent in a suitable reaction vessel. As the aluminum alcoholate there preferably is employed aluminum isopropoxide. However, other aluminum alcoholates may be employed, such as aluminum ethoxide, aluminum propoxide, aluminum allyloxide, aluminum isobutoxide, aluminum chloroisopropoxide, and the like, alcoholates of alcohols containing from 1 to 3 carbon atoms being especially suitable. The aluminum alcoholate may be prepared readily by methods that are known to those skilled in the art to which the invention pertains. For example, aluminum isopropoxide may be prepared by reacting metallic aluminum and isopropyl alcohol according to known methods, if desired with the aid of a promotor or catalyst for the reaction, such as mercuric chloride. The crude aluminum isopropoxide thus prepared may be employed directly in the process of the invention, as after dissolving it in an organic solvent and removing any sediment, or it may be employed in a purified form, as after purification by fractional distillation or according to other applicable methods. The amount of the aluminum alcoholate that is employed is not highly critical. It is preferred to employ at least about 0.04 mole of the catalyst per mole of the acrolein, a preferred range being from about 0.04 to about 1.0 mole of the catalyst per mole of acrolein. Smaller amounts of the aluminum alcoholate may be employed, but since decreased efficiency of the process results, such lower amounts are less desirable. Larger amounts also may be employed, although the use of excessively large amounts of the catalyst tends to be uneconomic.

As the solvent medium, there may be employed, for example, xylene or other aromatic hydrocarbon solvents, carbon tetrachloride, chloroform, or other halogenated hydrocarbon solvents, ethyl acetate or other esters, ethyl alcohol, isopropyl alcohol or other alcohols, diethyl ether or other ethers, and like anhydrous organic solvents. If the allyl acrylate is to be recovered from the reaction mixture by distillation, the solvent of course desirably is one that does not boil at a temperature so near the boiling temperature of the desired product that the separation would be impeded. The solvent conveniently may be added to the reaction mixture as the solvent in a previously prepared solution of the aluminum alcoholate. Alternatively, it may be added separately to the reaction mixture or to either the acrolein or the aluminum alcoholate prior to their admixture. From about 10 to about 1000 volumes of the solvent per 100 volumes of the acrolein may be employed conveniently. Larger amounts, although operable, may reduce the efficiency of the process through excessive dilution of the reactants.

After the acrolein, the aluminum alcoholate, and the anhydrous solvent have been mixed, the reaction mixture is allowed to stand until the reaction is substantially complete. Reaction times not over about 20 hours ordinarily are entirely adequate, although longer times may be employed if desired. Frequently reaction times of less than 4 hours are sufficient. During the reaction, the reaction mixture is maintained at a suitable reaction temperature, desirably between about 0° C. and about 65° C. We prefer to employ temperatures of from about 20° C. to about 45° C. during the reaction. We prefer to avoid use of temperatures above about 65° C. The reaction mixture may be agitated during the reaction, although not necessarily so. Completion of the reaction may be determined conveniently by measuring the content of esters in the reaction mixture according to known methods and following the change in such content as the reaction proceeds, the reaction for practical purposes being complete when no further increase in ester content occurs.

After completion of the reaction, the allyl acrylate may be recovered from the reaction mixture in any suitable manner. Prior to effecting the recovery, it is preferred to remove, or to destroy or decompose, the aluminum alcoholate that is present in the mixture, since the recovery is thereby facilitated. This may be accomplished as by filtration if the catalyst is solid, or by adding water to the reaction mixture, as when the aluminum alcoholate is present in solution. The aluminum hydroxide which is formed by the addition of water may be filtered or centrifuged off, or less desirably it may be dissolved as by the addition of aqueous acid to the mixture. Recovery of the allyl acrylate may be effected according to any suitable method, such as by extraction with selective solvents, followed by distillation of the extract, by direct distillation, by steam distillation, and in other ways.

The following examples will illustrate certain of the specific embodiments of the present invention. It will be understood, of course, that the invention is to be ascertained by reference to the appended claims and not according to the particular embodiments thereof that are described in the examples.

*Example I*

Acrolein is prepared according to the method of U. S. Patent No. 2,309,576, by the pyrolysis of diallyl ether at 575° C. to 600° C. The crude products of the pyrolysis are cooled to the liquid state, and the acrolein is separated from unreacted diallyl ether and other materials by extraction of the liquid products with water. Hydroquinone is added to the water extract and the extract is fractionally distilled under atmospheric pressure. Light ends distilling from 49° C. to 52° C. are removed, a heart cut distilling from 52° C. to 54° C. is collected, and the bottoms are discarded. Hydroquinone (0.1%) is added to the heart cut.

The heart cut is cooled to —70° C. by immersing a container containing it in a mixture of solid $CO_2$ and isopropyl alcohol, and the liquid portion is separated by filtration at —70° C. from the solids which are formed. The filtrate is fractionally distilled under atmospheric pressure, the portion which distills from 52.6° C. being collected in a receiving flask closed from the atmosphere. Hydroquinone (0.1%) is added to the collected distillate. The acrolein is found by analysis to contain 98.8 to 99.0% $CH_2=CH-CHO$ and less than 0.6% water.

A 2 cc. portion of the acrolein is diluted at 25° C. with 50 cc. of iso-octane which previously has been saturated at 25° C. with water. A clear solution forms.

Aluminum isopropoxide is prepared by reacting isopropyl alcohol with metallic aluminum. The aluminum first is cleaned by washing with acetone, then with dilute aqueous hydrochloric acid, and then with isopropyl alcohol until free of acid. A slight molar excess of isopropyl alcohol is added to the cleaned aluminum, followed by a small quantity of mercuric chloride to initiate the reaction. The reaction commences immediately, as evidenced by the evolution of hydrogen. After the initial reaction recedes, the mixture is heated on the steam bath for several hours while protected from contact with the water vapors. Excess isopropyl alcohol is removed by evaporation under reduced pressure, and the remaining aluminum isopropoxide is dissolved in xylene to form a saturated solution, insoluble material such as particles of unreacted aluminum, being allowed to settle out.

A mixture of 100 cc. of the saturated xylene solution of aluminum isopropoxide (1.77 moles aluminum isopropoxide) and 200 cc. of the acrolein is prepared, and maintained in a sealed flask at 30–35° C. for 3 hours. Water is added to the mixture at the end of this time and the mixture is subjected to steam distillation. The distillate is saturated with sodium chloride to salt out the organic products, the organic layer is separated and redistilled through an efficient fractionating column.

Allyl acrylate is recovered as the fraction distilling from 122 to 124° C. (literature value, 122° C.; J. Am. Chem. Soc., 65, 763 (1943)). There are obtained 54.8 parts of allyl acrylate, corresponding to a conversion of 27.4% based on the acrolein employed. Allyl alcohol also is separated in a conversion of 11.8% based on the acrolein employed. The allyl acrylate is found to have a bromine number of 280 and 285 in two successive determinations by the Lucas-Pressman method, compared to the theoretical value of 285.

Example II

In this experiment, acrolein is prepared by dehydrating glycerol in contact with acid potassium sulfate at an elevated temperature, according to the method of Adkins and Hartung, "Organic Syntheses," collected volume I, 2nd edition, page 15, Wiley. The volatile products formed by the dehydration reaction are condensed and collected in a cooled flask containing hydroquinone, and then fractionally distilled from this flask into a second flask containing hydroquinone. The distillate is treated with solid sodium carbonate to neutralize any acid present, filtered, and redistilled under atmospheric pressure into a container containing hydroquinone and protected from light. A 2 cc. portion of the distillate is diluted at 25° C. with 50 cc. of iso-octane that has been previously saturated at 25° C. with water. A turpid solution forms.

The redistilled acrolein thus prepared is cooled to —70° C. and filtered from solid materials which form, and then distilled, as in Example I. A 2 cc. portion of the cooled, filtered, and distilled acrolein is mixed at 25° C. with 50 cc. of iso-octane which has been previously saturated with water at 25° C. A clear solution forms.

A mixture of 45 cc. of the saturated solution of aluminum isopropoxide in xylene that was prepared in Example I and 36 cc. of the acrolein is prepared and kept in a sealed flask at 0° C. for 16 hours. At the end of this time, water is added to the mixture, the resultant mixture is extracted with xylene, and the xylene extract is fractionally distilled. Allyl acrylate is recovered in a yield of about 40% based on the acrolein applied.

Example III

Acrolein is prepared as in Example I by the pyrolysis of diallyl ether and distillation of a water extract of the crude liquefied products of the pyrolysis, the heart cut distilling from 48° C. to 52° C. being collected. Finely divided anhydrous calcium sulfate is added to the heart cut in a weight ratio of 1:2, with agitation. The acrolein is allowed to remain in contact with the calcium sulfate overnight, and then filtered. A test portion of the filtrate, when dissolved in iso-octane as in the preceding examples, forms a clear solution.

A mixture of 25 cc. of the saturated solution of aluminum isopropoxide that was prepared in Example I and 50 cc. of the acrolein is maintained in a closed flask at 60° C. for 30 minutes. Water is added to the mixture at the end of this time, and the mixture is subjected to steam distillation. The distillate consists of an aqueous phase and an organic phase. Allyl acrylate is recovered in a conversion of about 16% by separation of the organic portion of the distillate and fractional distillation thereof.

We claim as our invention:

1. In a process for the preparation of allyl acrylate by the condensation of acrolein in the presence of aluminum isopropoxide, wherein acrolein is mixed with a solution of aluminum isopropoxide in an aromatic hydrocarbon solvent therefore, the mixture is allowed to stand, and allyl acrylate is subsequently recovered, the improvement which comprises furnishing to said process as the acrolein reactant a quantity of acrolein which, upon dilution of a 2 cubic centimeter test portion thereof at about 25° C. with 25 times its volume of iso-octane saturated at about 25° C. with water, forms a clear solution; by means of which improvement allyl acrylate is produced as product of the condensation of the acrolein.

2. In a process for the preparation of allyl acrylate by the condensation of acrolein in the presence of aluminum isopropoxide, wherein acrolein is treated with aluminum isopropoxide in the presence of an inert organic solvent therefor at a temperature between about 0° C. and about 65° C., and allyl acrylate is subsequently recovered, the improvement which comprises furnishing to said process as the acrolein reactant a quantity of acrolein which, upon dilution of a 2 cubic centimeter test portion thereof at about 25° C. with 25 times its volume of iso-octane saturated at about 25° C. with water, forms a clear solution; by means of which improvement allyl acrylate is produced as product of the condensation of the acrolein.

3. In a process for the preparation of allyl acrylate by the condensation of acrolein in the presence of an aluminum alcoholate, wherein acrolein is treated in the presence of an aromatic hydrocarbon solvent at a temperature between about 0° C. and about 65° C. with an aluminum alcoholate of an alcohol containing from 1 to 3 carbon atoms, inclusive, and allyl acrylate is subsequently recovered, the improvement which comprises furnishing to said process as the acrolein reactant a quantity of acrolein which, upon dilution of a 2 cubic centimeter test portion thereof at about 25° C. with 25 times its volume of iso-octane saturated at about 25° C. with water, forms a clear solution; by means of which improvement allyl acrylate is produced as product of the condensation of the acrolein.

4. In a process for the preparation of allyl acrylate by the condensation of acrolein in the presence of an aluminum alcoholate, wherein acrolein is treated in the presence of an inert organic solvent with an aluminum alcoholate of an alcohol containing from 1 to 3 carbon atoms, inclusive, and allyl acrylate is subsequently recovered, the improvement which comprises furnishing to said process as the acrolein reactant a quantity of acrolein which, upon dilution of a 2 cubic centimeter test portion thereof at about 25° C. with 25 times its volume of iso-octane saturated at about 25° C. with water, forms a clear solution; by means of which improvement allyl acrylate is produced as product of the condensation of the acrolein.

GEORGE W. HEARNE.
CARL G. SCHWARZER.

REFERENCES CITED

The following references are of record in the file of this patent:

UNITED STATES PATENTS

| Number | Name | Date |
|---|---|---|
| 2,250,520 | Bludworth | July 29, 1941 |

FOREIGN PATENTS

| Number | Country | Date |
|---|---|---|
| 362,458 | Great Britain | Dec. 4, 1931 |